United States Patent
Lee et al.

(10) Patent No.: US 11,197,313 B2
(45) Date of Patent: Dec. 7, 2021

(54) METHOD AND USER EQUIPMENT FOR TRANSMITTING DATA UNIT

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 368 days.

(21) Appl. No.: 16/467,558

(22) PCT Filed: Jan. 4, 2018

(86) PCT No.: PCT/KR2018/000206
§ 371 (c)(1),
(2) Date: Jun. 7, 2019

(87) PCT Pub. No.: WO2018/128431
PCT Pub. Date: Jul. 12, 2018

(65) Prior Publication Data
US 2021/0274540 A1    Sep. 2, 2021

Related U.S. Application Data

(60) Provisional application No. 62/443,002, filed on Jan. 6, 2017, provisional application No. 62/453,464, filed on Feb. 1, 2017.

(51) Int. Cl.
*H04W 72/14* (2009.01)
*H04W 72/12* (2009.01)

(52) U.S. Cl.
CPC ....... *H04W 72/14* (2013.01); *H04W 72/1284* (2013.01)

(58) Field of Classification Search
CPC .................. H04W 72/14; H04W 72/1284
See application file for complete search history.

(56) References Cited

U.S. PATENT DOCUMENTS

2014/0161108 A1   6/2014 Lohr et al.
2020/0267753 A1*  8/2020 Adjakple .......... H04W 72/1226

FOREIGN PATENT DOCUMENTS

WO    2016029736 A1    3/2016

OTHER PUBLICATIONS

LG Electronics Inc., "Numerology aspect in MAC", 3GPP TSG-RAN WG2 NR Ad Hoc, Jan. 17-19, 2017, R2-1700426.
(Continued)

*Primary Examiner* — Vinncelas Louis
(74) *Attorney, Agent, or Firm* — Dentons US LLP

(57) ABSTRACT

A user equipment (UE) receives first configuration information for one or more numerology sets, each numerology set including one or more numerologies. The UE receives second configuration information for one or more logical channels, each logical channel mapped to one or more numerologies. The UE receives a first uplink (UL) grant for new transmission, the first UL grant including information indicating a numerology set associated with the first UL grant. The UE generates a MAC PDU. The UE performs a new transmission of the MAC PDU using the first UL grant. The MAC PDU contains data from a logical channel of which every numerology belongs to the numerology set.

13 Claims, 10 Drawing Sheets

(56) References Cited

OTHER PUBLICATIONS

LG Electronics Inc.: "Support of different numerologies in New RAT", R2-168374, 3GPP TSG RAN WG2 Meeting #96, Reno, USA, Nov. 14-18, 2016.
Ericsson: "Impacts on the UL grant and LCP of different numerologies and flexible TTI", R2-168659, 3GPP TSG RAN WG2 Meeting #96, Reno, USA, Nov. 14-18, 2016.
Samsung: "Logical Channel Prioritization Considering Multiple Numerologies and/or TTIs", R2-168040, 3GPP TSG RAN WG2 Meeting #96, Reno, USA, Nov. 14-18, 2016.
Huawei: "LCP with Multiple Numerologies", R2-167575, 3GPP TSG RAN WG2 Meeting #96, Reno, USA, Nov. 14-18, 2016.

\* cited by examiner (a) Control-Plane Protocol Stack (b) User-Plane Protocol Stack

METHOD AND USER EQUIPMENT FOR TRANSMITTING DATA UNIT

This application is a National Stage Entry of International Application No. PCT/KR2018/000206 filed Jan. 4, 2018, which claims priority to U.S. Provisional Application Nos. 62/443,002 filed Jan. 6, 2017 and 62/453,464 filed Feb. 1, 2017, all of which are incorporated herein by reference.

TECHNICAL FIELD

The present invention relates to a wireless communication system, and more particularly, to a method for transmitting a data unit and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of transmitting, by a user equipment (UE), a data unit in a wireless communication system. The method comprises: receiving first configuration information for one or more numerology sets, each numerology set including one or more numerologies; receiving second configuration information for one or more logical channels, each logical channel mapped to one or more numerologies; receiving a first uplink (UL) grant for new transmission, the first UL grant including information indicating a numerology set associated with the first UL grant; generating a medium access control (MAC) protocol data unit (PDU); and performing a new transmission of the MAC PDU using the first UL grant. The MAC PDU is generated to contain data from a logical channel of which every numerology belongs to the numerology set.

In another aspect of the present invention, provided herein is a user equipment for transmitting a data unit in a wireless communication system. The UE comprises: a radio frequency (RF) unit, and a processor configured to control the RF unit. The processor may be configured to: control the RF unit to receive first configuration information for one or more numerology sets, each numerology set including one or more numerologies; control the RF unit to receive second configuration information for one or more logical channels, each logical channel mapped to one or more numerologies; control the RF unit to receive a first uplink (UL) grant for new transmission, the first UL grant including information indicating a numerology set associated with the first UL grant; generate a medium access control (MAC) protocol data unit (PDU); and control the RF unit to perform a new transmission of the MAC PDU using the first UL grant. The MAC PDU is generated to contain data from a logical channel of which every numerology belongs to the numerology set.

In each aspect of the present invention, the MAC PDU is generated to contain no data from a logical channel mapped to a numerology not belonging to the numerology set.

In each aspect of the present invention, the UE may receive a second UL grant for retransmission. The second UL grant includes information indicating a numerology for the retransmission. The UE may perform a retransmission of the MAC PDU by using the second UL grant if the numerology for the retransmission belongs to the numerology set indicated by the first UL grant.

In each aspect of the present invention, the UE may not perform the retransmission of the MAC PDU if the numerology for the retransmission does not belong to the numerology set indicated by the first UL grant.

In each aspect of the present invention, each numerology may indicate at least a subcarrier spacing or transmission timer interval duration.

In each aspect of the present invention, the first configuration information may indicate each numerology set by indicating the minimum and/or maximum value(s) of numerologies belonging to a corresponding numerology set.

In each aspect of the present invention, the UE may be an autonomous vehicle that communicates with at least a mobile terminal, a network, and another autonomous vehicle other than the UE. The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

Also, it is possible to efficiently transmit/receive a small amount of data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
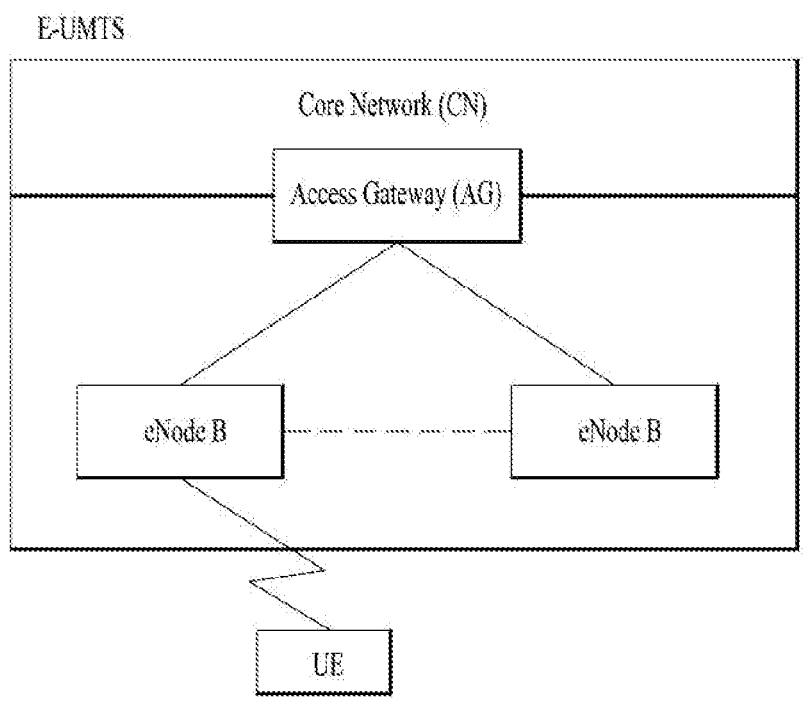
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB. For convenience of description, in describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, monitoring a channel implies attempting to decode the channel. For example, monitoring a PDCCH implies attempting to decode PDCCH(s) (or PDCCH candidates).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 38.xxx series may be referenced.

Figure 2:
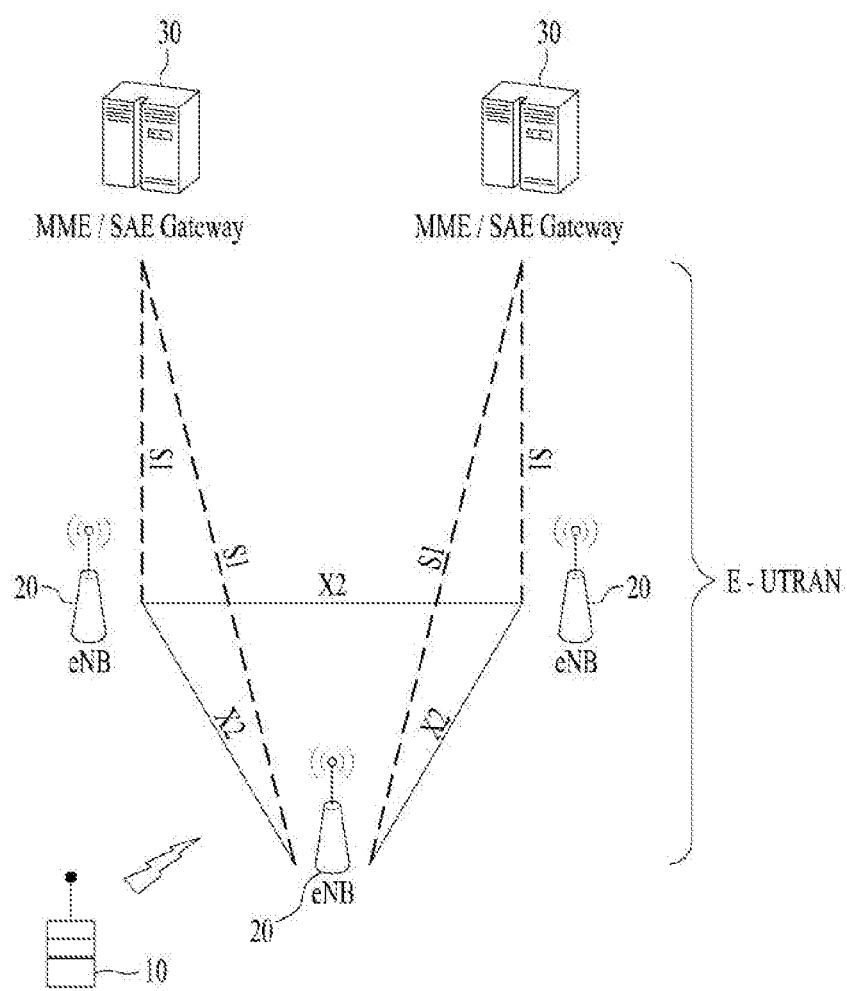
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
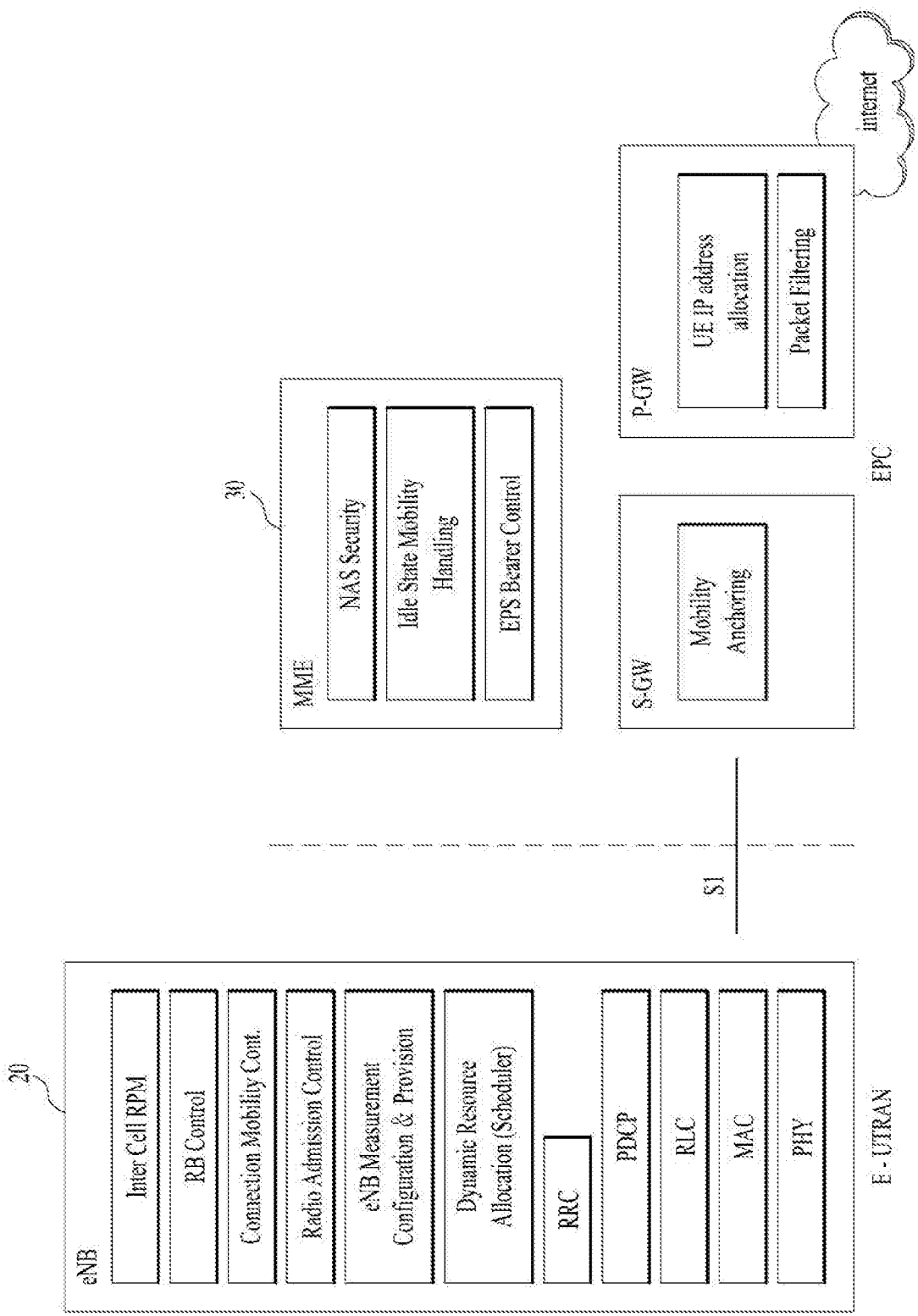
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
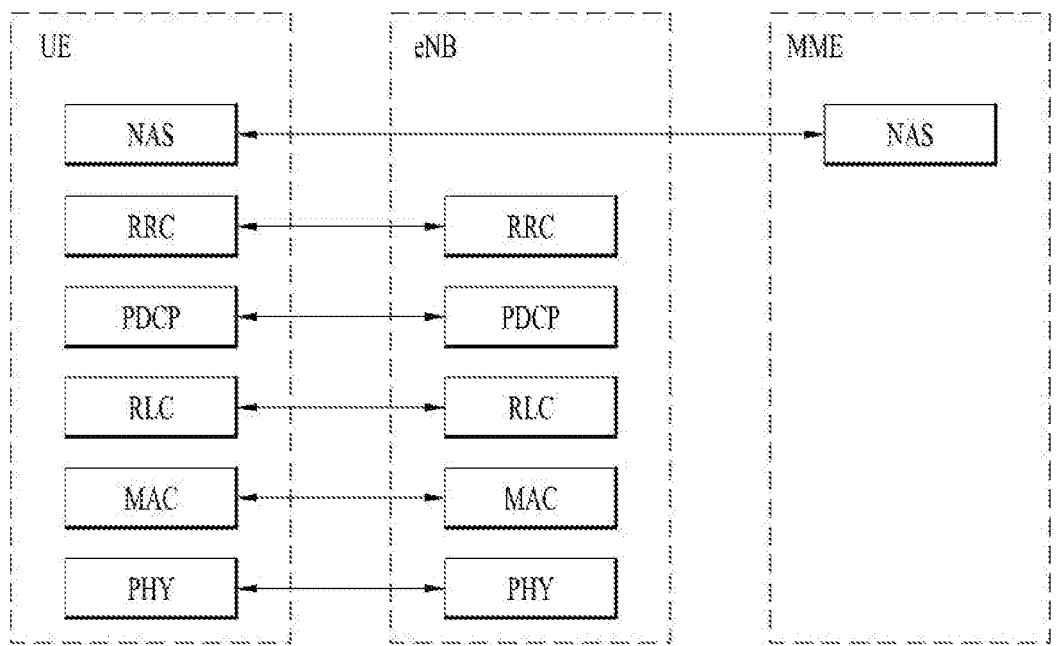
FIG. 4 is a diagram showing a control plane and a user plane of a radio interface protocol between a UE and an E-UTRAN based on a 3GPP radio access network standard.
Figure 4:
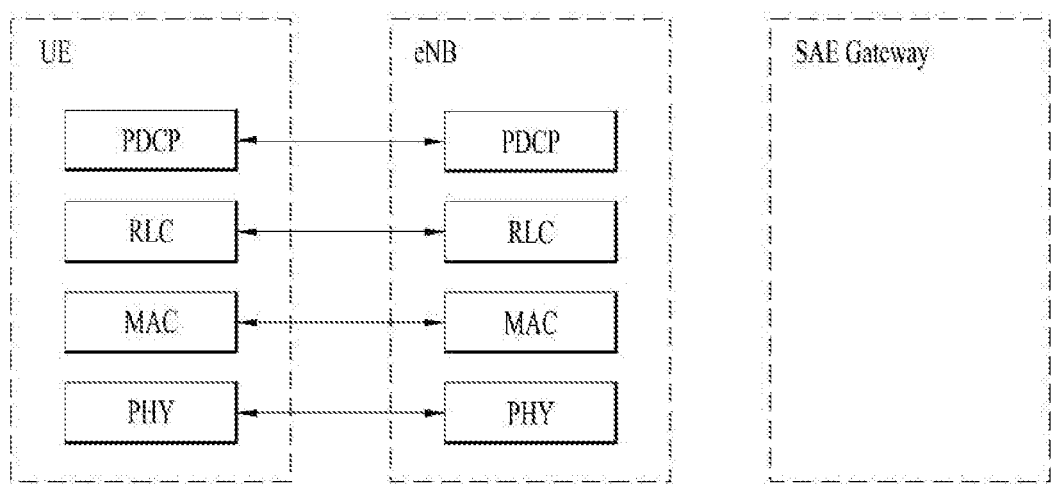

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
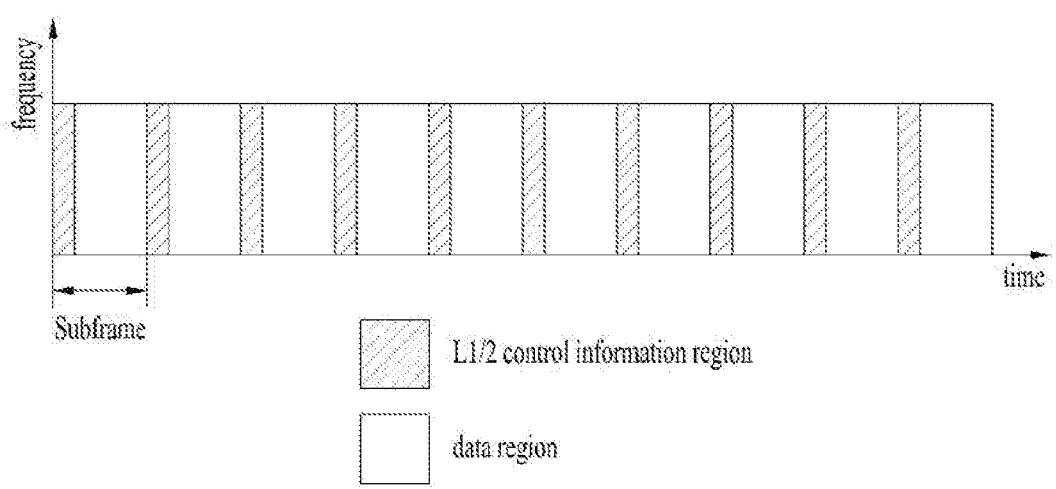
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, an opportunity of transmission of an UL grant or a DL grant is present every 1 ms, and the UL/DL grant opportunity does not exists several times in less than 1 ms. Therefore, the TTI in the legacy LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information. In the present invention, a PDCCH addressed to a certain RNTI means that the PDCCH is CRC-masked with the certain RNTI. A UE may attempt to decode a PDCCH using the certain RNTI if the UE is monitoring a PDCCH addressed to the certain RNTI.

Figure 6:
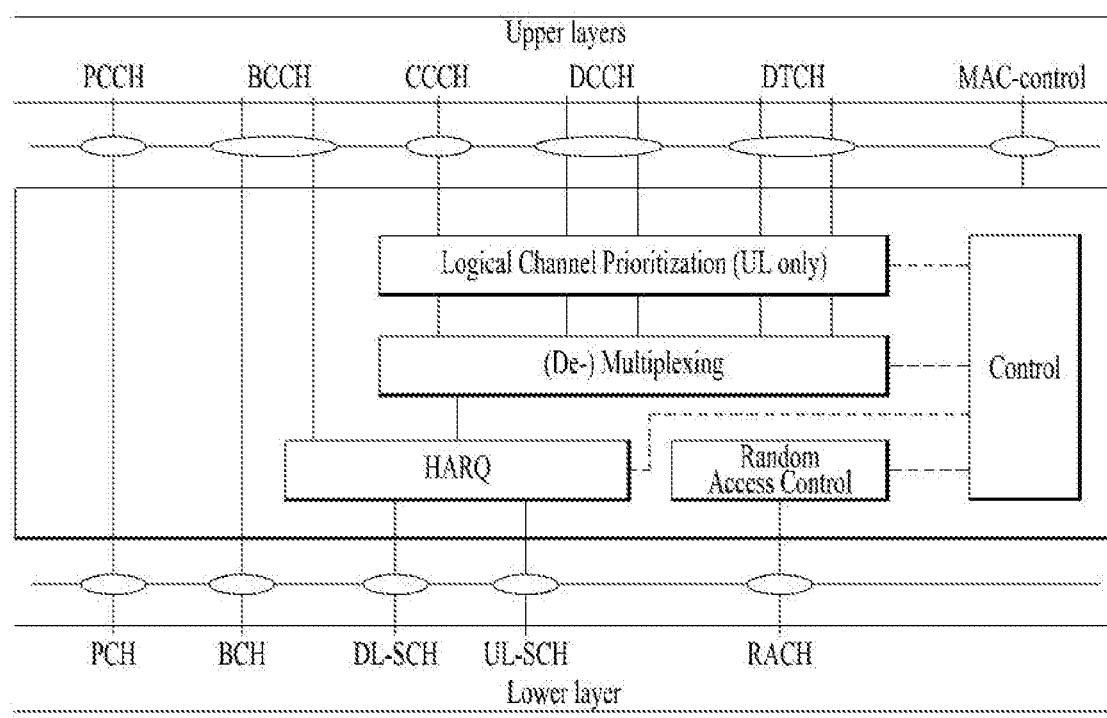
FIG. 6 is a diagram for medium access control (MAC) structure overview in a UE side.

FIG. 6 is a diagram for medium access control (MAC) structure overview in a UE side.

The MAC layer supports the following functions: mapping between logical channels and transport channels; multiplexing of MAC SDUs from one or different logical channels onto transport blocks (TB) to be delivered to the physical layer on transport channels; demultiplexing of MAC SDUs from one or different logical channels from transport blocks (TB) delivered from the physical layer on transport channels; scheduling information reporting (e.g. scheduling request, buffer status reporting); error correction through HARQ; priority handling between UEs by means of dynamic scheduling; priority handling between logical channels of one MAC entity; Logical Channel Prioritization (LCP); transport format selection; and radio resource selection for sidelink (SL).

The logical channel prioritization (LCP) procedure is applied when a new transmission is performed. RRC controls the scheduling of uplink data by signalling for each logical channel: priority where an increasing priority value indicates a lower priority level, prioritisedBitRate which sets the prioritized bit rate (PBR), bucketSizeDuration which sets the bucket size duration (BSD). The eNB may provide a UE with the information element (IE) LogicalChannel-Config, which is used to configure logical channel parameters, through RRC signaling. The parameter bucketSize-Duration for a logical channel has a value in milliseconds, and value ms50 corresponds to 50 ms, ms100 corresponds to 10 ms and so on. The parameter prioritisedBitRate for a logical channel has a value in kilobytes/second, Value kBps0 corresponds to 0 kB/second, kBps8 corresponds to 8 kB/second, kBps16 corresponds to 16 kB/second and so on. The parameter priority for a logical channel has an integer value.

The MAC entity shall maintain a variable Bj for each logical channel j. Bj shall be initialized to zero when the related logical channel is established, and incremented by the product PBR*TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR*BSD, where PBR and BSD are configured by upper layers.

The MAC entity shall perform the following LCP procedure when a new transmission is performed:

The MAC entity shall allocate resources to the logical channels in the following steps:

Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s).;

Step 2: the MAC entity shall decrement Bj by the total size of MAC SDUs served to logical channel j in Step 1 (NOTE: The value of Bj can be negative.).;

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximize the transmission of data;

if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted).

The MAC entity shall not transmit data for a logical channel corresponding to a radio bearer that is suspended (the conditions for when a radio bearer is considered suspended are defined in 3GPP 36.331).

For the LCP procedure, the MAC entity shall take into account the following relative priority in decreasing order:

MAC control element for C-RNTI or data from UL-CCCH;

MAC control element for data volume and power headroom report (DPR);

MAC control element for SPS confirmation;

MAC control element for BSR, with exception of BSR included for padding;

MAC control element for PHR, Extended PHR, or Dual Connectivity PHR;

MAC control element for Sidelink BSR, with exception of Sidelink BSR included for padding;

data from any Logical Channel, except data from UL-CCCH;

MAC control element for Recommended bit rate query;

MAC control element for BSR included for padding;

MAC control element for Sidelink BSR included for padding.

When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

Figure 7:
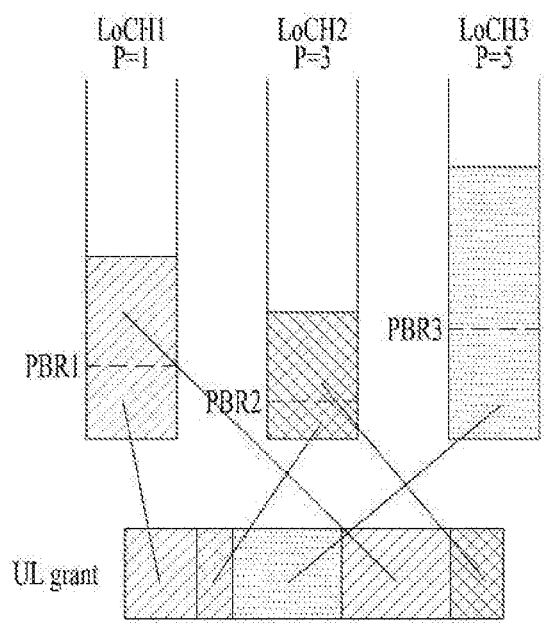
FIG. 7 illustrates allocating uplink resources to logical channels according to a logical channel prioritization (LCP) procedure in the current LTE/LTE-A system.

FIG. 7 illustrates allocating uplink resources to logical channels according to a logical channel prioritization (LCP) procedure in the current LTE/LTE-A system.

In FIG. 7, "P" denotes a priority value for a logical channel (LoCH). Referring to FIG. 7, for example, a priority value for LoCH1, a priority value for LoCH2 and a priority value for LoCH3 are 1, 3 and 5, respectively. LoCH1, LoCH2 and LoCH3 are allocated resources of the UL grant in a decreasing priority order according to priority bit rate 1 (PBR1), priority bit rate 2 (PBR2) and priority bit rate 3 (PBR3), respectively. In other words, LoCH1 of the lowest priority value is allocated resource of the UL grant first as much as the amount of PBR1, then LoCH2 of the second lowest priority value is allocated resource of the UL grant as much as the amount of PBR2, and then LoCH3 of the highest priority value is allocated resource of the U grant as much as the amount of PBR3. The remaining resources of the UL grant, excluding resources corresponding to those of PBR1, PBR2 and PBR3, are then allocated to LoCH1, LoCH2 and LoCH3 in an decreasing priority order.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for the new RAT (NR) System (also referred to as 5G new RAT). It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

In the legacy LTE/LTE-A, transmission time interval (TTI) is used in MAC layer as a basic time unit that MAC delivers a MAC PDU to PHY, which is fixed to 1 ms. In other words, HARQ entity delivers a MAC PDU to PHY once per TTI.

Multiple numerologies, i.e., multiple subcarrier spacings, such as 30 kHz, 60 kHz, etc, are being studied for the new radio access technology. multiple time units such as slot and mini-slot are under discussion in multiple subcarrier spacing, where mini-slot is the smallest possible scheduling unit and smaller than a slot or subframe. Although the concept of slot has already been in the legacy LTE/LTE-A, it is fixed to 0.5 ms corresponding to 7 OFDM symbols and transparent to the MAC layer operation. In NR, however, slot or mini-slot may have different durations in time depending on the subcarrier spacing. For example, a slot duration would be 0.5 ms for 30 kHz subcarrier spacing while a slot duration would be 0.25 ms for 50 kHz subcarrier spacing. Furthermore, it is required for MAC layer to operate based on slot and/or mini-slot, i.e., the HARQ entity delivers a MAC PDU to PHY once per slot or mini-slot. Considering that it is up to network decision whether to schedule in unit of subframe, slot, or mini-slot, or which subcarrier spacing is to be used, the time unit used for the MAC layer operation may change dynamically. Although the present invention is described with reference to 1 ms TTI and a TTI length shorter than 1 ms, the present invention can be also applied to a TTI duration longer than 1 ms in the same way as or similar way to the following description.

A short TTI with 7 OFDM symbols and 2 OFDM symbols are introduced as a slot and a mini-slot, respectively, and a short TTI with 1 OFDM symbol is under discussion for a mini-slot. Accordingly, MAC needs to operate based on multiple TTIs.

In the following description, a numerology refers to a subcarrier spacing and/or a TTI duration.

In order to support multiple numerologies and TTI durations, it needs to configure a numerology/TTI duration for a logical channel.

Numerology would be related to the requirement/characteristics of data transmission, e.g., latency. For example, short numerology will be configured to a radio bearer (RB) for which low latency is required while long numerology will be configured to a RB which is not delay sensitive. Given that the requirement/characteristics of data transmission wouldn't change dynamically, it would be sufficient for a UE/network to configure the numerology once when configuring the RB, and use the configured numerology during the lifetime of the RB. It implies that the numerology associated with the RB can change only by release and addition of the RB. For example, once the numerology is associated with the RB, it is not changed until the RB is released.

In the meantime, if multiple numerologies/TTI durations are needed to be configured for a logical channel, one straightforward method is to indicate all possible numerologies/TTI durations for the logical channel. For a signaling overhead reduction, it was proposed to indicate the maximum numerology/TTI duration for the logical channel. It means that all numerologies/TTI durations less than the maximum numerology/TTI duration can be applied to the logical channel. However, in this case, there is no way to restrict some specific numerology/TTI durations to a specific logical channel. For example, the network may want to allow small TTI duration(s) to logical channels for URLLC service while not allowing those TTI durations for logical channels for eMBB services. Therefore, a new mechanism is needed to exclude some specific numerology that cannot be used for the logical channel. Therefore, a new mechanism is needed to exclude some specific numerology that cannot be used for the logical channel.

Accordingly, the present invention proposes a method for configuring numerology for a logical channel. The present invention proposes a new method for LCP supporting different numerologies.

In 3GPP meetings for the NR system, it was agreed that LCP takes into account the mapping of logical channel to one or more numerology/TTI duration. The intention was that an uplink grant associated with a specific TTI duration can be used only for the transmission of a MAC PDU including the data from logical channels which are mapped to that specific TTI duration. As MAC performs LCP to generate a MAC PDU for a new transmission, the agreement would read that, for a new transmission, the MAC PDU should include only data from logical channels that are mapped to the TTI duration associated with the uplink grant.

In the meanwhile, HARQ retransmission may be performed across different numerologies and/or TTI durations. Then, it needs to be decided whether the retransmission can be performed across any numerology/TTI duration or the retransmission can be performed only across a numerology/TTI duration which is commonly mapped to all logical channels included in the MAC PDU. Considering the original intention of mapping a logical channel to one or more numerology/TTI duration, it doesn't make sense to restrict the mapping only for the new transmission and allow retransmission across any numerology/TTI duration.

Figure 8:
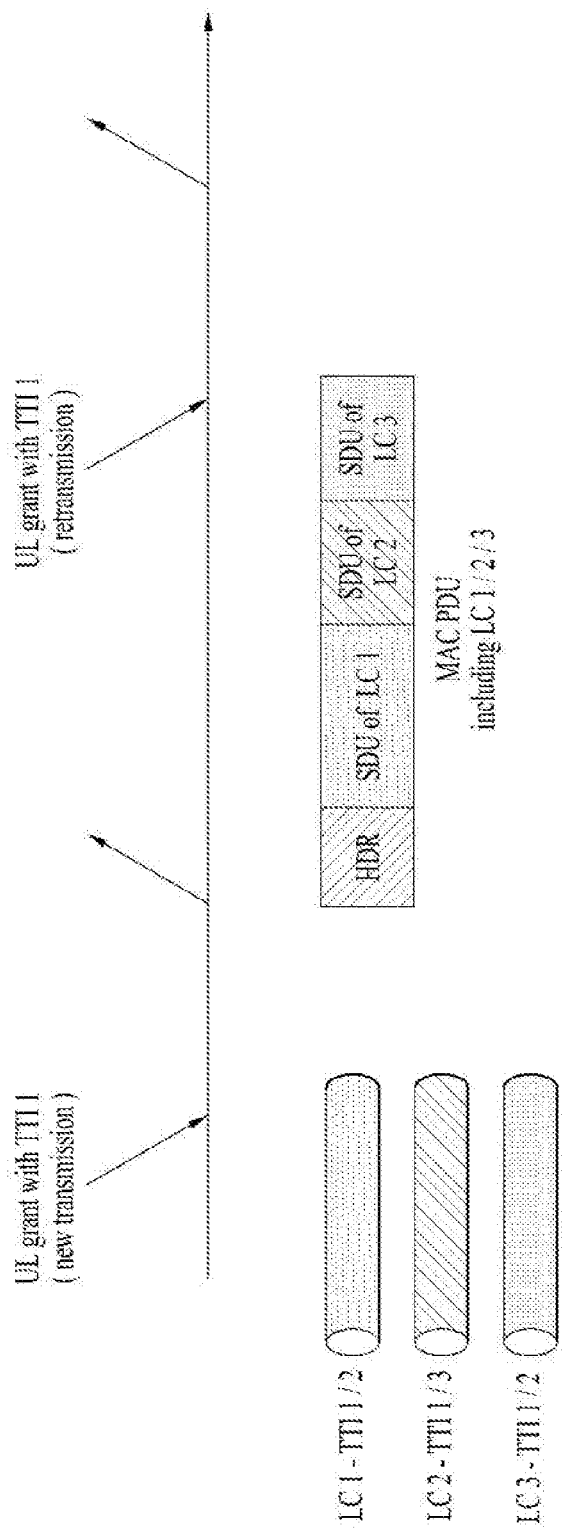
FIG. 8 illustrates one approach for a logical channel prioritization for logical channel(s) with multiple numerologies.

FIG. 8 illustrates one approach for a logical channel prioritization for logical channel(s) with multiple numerologies. Hereinafter, the approach shown in FIG. 8 is referred to as Approach 1.

In Approach 1, an uplink grant is associated with one specific numerology/TTI duration. For new transmission, MAC PDU is generated by including logical channels that are mapped to the numerology/TTI duration of the uplink grant. For retransmission, an uplink grant should be associated with a numerology/TTI duration that is commonly mapped to all logical channels included in the MAC PDU. In the example of FIG. 8, if a UE receives a UL grant with TTI 1 is received, then the UE includes data of LC1, LC2 and LC3 into a MAC PDU since all of LC1, LC2 and LC3 are associated with TTI 1.

Figure 9:
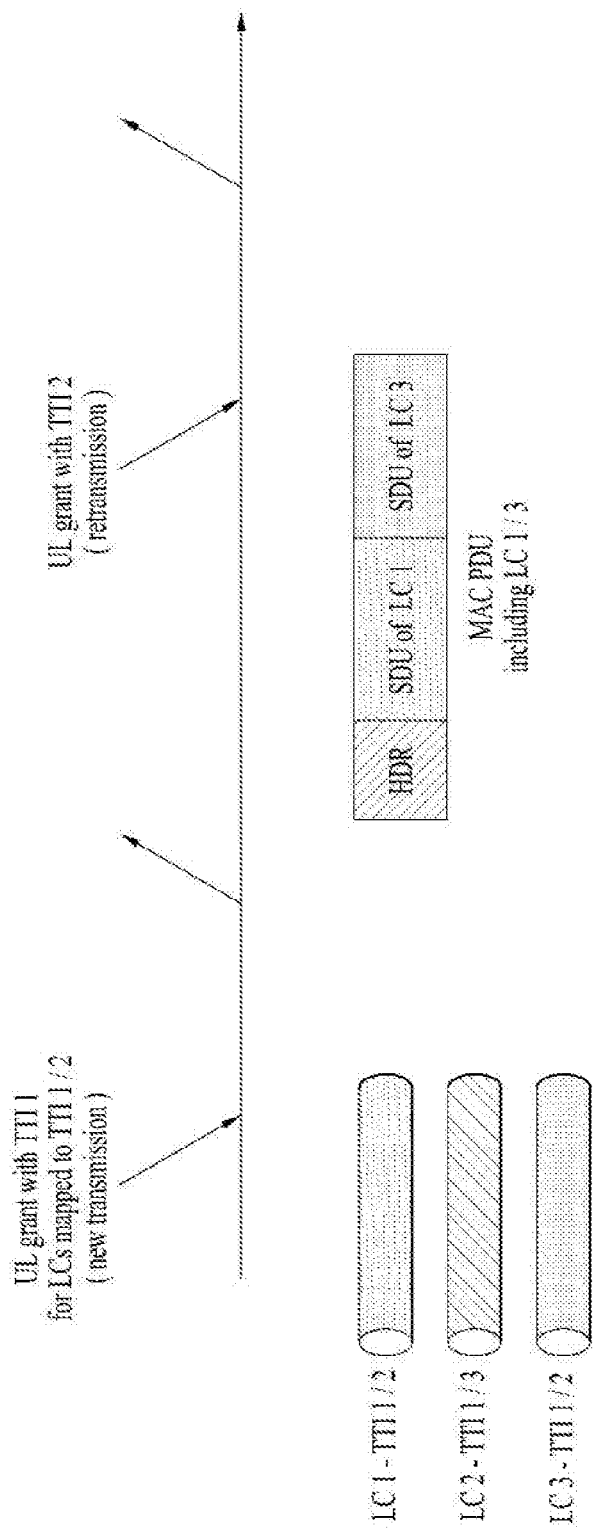
FIG. 9 illustrates another approach for a logical channel prioritization for logical channel(s) with multiple numerologies according to the present invention.

FIG. 9 illustrates another approach for a logical channel prioritization for logical channel(s) with multiple numerologies according to the present invention. Hereinafter, the approach of the present invention, shown in FIG. 9, is referred to as Approach 2.

In Approach 2, a UE receives an uplink grant with an indication indicating a numerology set. When the UE generates a MAC PDU to be transmitted using the uplink grant, the UE generates the MAC PDU by including data of one or more logical channels which are mapped to all numerologies included in the numerology set. In other words, the LCP is performed only for logical channel(s) of which every numerology is included in a numerology set associated with an uplink grant.

In Approach 2, an uplink grant is associated with one specific numerology/TTI duration but additionally indicates a set of numerologies/TTI durations. For new transmission, a MAC PDU is generated by including logical channels that are mapped to the set of numerologies/TTI durations of the uplink grant. In the example of FIG. 9, a UE receives a UL grant with TTI 1 for LCs mapped to TTI 1/2, and then the UE includes data of LC1 and LC3 into a MAC PDU since numerologies of LC1 and LC3 are included in the numerology set (TTI 1, TTI 2) indicated by the UL grant. Numerologies of LC2 is TTI 1 and TTI 3 and the TTI 3 belongs to the numerology set (TTI 1, TTI 2) indicated by the UL grant. Therefore, the UE does not include data of LC2 into the MAC PDU.

For retransmission, an uplink grant should be associated with a numerology/TTI duration that is commonly mapped to all logical channels included in the MAC PDU. In the example of FIG. 9, an uplink grant for retransmission may indicate TTI 1 or TTI 2 for retransmission since LC1 and LC2 are commonly mapped to TTI 1 and TTI 2.

For retransmission, in both of Approach 1 and Approach 2, it is left up to the network to provide uplink grant associated with a TTI duration which is commonly mapped to all logical channels included in the MAC PDU. This implies that the UE should use only the uplink grant associated a numerology/TTI duration that is mapped to all logical channels included in the MAC PDU. If the UE receives an uplink grant associated a numerology/TTI duration that is not mapped one of logical channels included in the MAC PDU, the UE should not use the uplink grant, i.e., the UE should ignore the uplink grant as it is an error case. The benefit of Approach 2 is that it allows more flexibility in providing an uplink grant for retransmission. In the examples of FIG. 8 and FIG. 9, Approach 1 has no choice but to provide an uplink grant with TTI 1 for retransmission, whereas Approach 2 allows an uplink grant with TTI 2 for retransmission. For Approach 2, an uplink grant needs to indicate a set of numerologies/TTI durations at least for new transmission, which would have an impact on uplink grant design. However, as the NR system anyway needs to design a new uplink grant by considering numerology/TTI duration, it wouldn't be a big problem.

Hereinafter, a data transmission method according to the present invention corresponding to Approach 2 is described in more detail.

A UE according to the present invention receives a numerology set configuration information from a network. The numerology set configuration information may include a numerology set identifier, i.e., NumSetID; and/or one or more numerologies included in the numerology set identified by the NumSetID.

The UE is configured with one or more logical channels by a network, where each logical channel is mapped to one or more numerologies. For this end, the UE receives a logical channel configuration information. The UE is configured with one or more logical channels based on the logical channel configuration information. The logical channel configuration information may include a logical channel identifier (LCHID); and/or a NumSetID indicating a numerology set associated with the logical channel identified by the LCHID. The NumSetID is used to inform the UE of a numerology set available to a new transmission and/or retransmission(s) for data of logical channel(s) configured to the UE.

The UE, which is configured with the one or more logical channels, receives an uplink grant. The UL grant may include a NumSetID indicating a numerology set associated with the uplink grant. Among the one or more numerologies included in the numerology set indicated by the NumSetID in the uplink grant, one numerology (TransNum) is used for transmission of the MAC PDU. For example, the one numerology (TransNum) may be used for determination of the size of MAC PDU, and/or modulation and coding of the MAC PDU generated by the UE. The TransNum may be included in the uplink grant in addition to the numerology set. The NumSetID may be included in the uplink grant for a new transmission. The NumSetID may or may not be included in the uplink grant for a retransmission.

If the UE receives the uplink grant including a NumSetID and/or a TransNum for a new transmission, the UE may generate a MAC PDU to be transmitted by using the uplink grant as follows.

The UE performs a LCP procedure for logical channel(s) which is/are associated with the numerology set indicated by the NumSetID included in the uplink grant. In other words, the UE generates the MAC PDU by including data from the logical channel(s) which is/are associated with the numerology set. In the MAC PDU, the UE doesn't include data from logical channel(s) which is/are not mapped to the numerology set.

After the UE generates the MAC PDU, the UE stores the generated MAC PDU in a HARQ buffer and performs a new transmission of the MAC PDU by using the TransNum included in the uplink grant.

After performing the new transmission, the UE may receive an uplink grant including a TransNum (and/or a NumSetID) for retransmission. If the UE receives an uplink grant for retransmission including a TransNum, the UE:

performs the retransmission of the MAC PDU stored in the HARQ buffer by using the uplink grant if the TransNum is one of the numerologies belonging to the numerology set included in the uplink grant for the new transmission of the MAC PDU; or if the TransNum is one of the numerologies belonging to the numerology set included in the uplink grant for the retransmission of the MAC PDU; and doesn't perform the retransmission of the MAC PDU by using the uplink grant, i.e., ignores the uplink grant for retransmission if the TransNum is not any of the numerologies belonging to the numerology set included in the uplink grant for the new transmission of the MAC PDU; or if the TransNum is not any of the numerologies belonging to the numerology set included in the uplink grant for the retransmission of the MAC PDU.

For the better understanding of the present invention, an example of a method according to the present invention is explained below.

Step 0. A network configures a UE with two numerology sets, where NumSet1=[Num1, Num2] and NumSet2=[Num1, Num3].

Step 1. The network configures the UE with three logical channels by sending logical channel configuration information including the following information: Logical Channel 1=LCID1, NumSet1; Logical Channel 2=LCID2, NumSet2; Logical Channel 3=LCID3, NumSet1.

Step 2. The UE configures three logical channels as indicated by the configuration information.

Step 3. The network sends an uplink grant for a new transmission to the UE which includes NumSetID=NumSet1 and TransNum=Num1.

Step 4. When the UE generates the MAC PDU to be transmitted via the uplink grant, the UE includes data from Logical Channel 1 and Logical Channel 3 because Logical Channel 1 and Logical Channel 3 are associated with NumSet1. The UE doesn't include data from Logical Channel 2 because Logical Channel 2 is not associated with NumSet1.

Step 5. The UE stores the generated MAC PDU in a HARQ buffer and performs a new transmission of the MAC PDU based on Num1 which is indicated by the uplink grant.

Step 6. If the network sends an uplink grant for a retransmission of the MAC PDU, which includes TransNum=Num2, the UE considers the uplink grant as a valid uplink grant and performs the retransmission of the MAC PDU based on Num2, as Num2 is included in the NumSet1 which was indicated by the uplink grant for the new transmission in Step 3. If the network sends an uplink grant for a retransmission of the MAC PDU, which includes TransNum=Num3, the UE considers the uplink grant as an invalid uplink grant and doesn't perform a retransmission of the MAC PDU, as Num3 is not included in the NumSet1 which was indicated by the uplink grant for the new transmission in Step 3.

Although, in the above example, the numerology sets are configured using separate numerology set configuration information from the logical channel configuration information in Step 0, the numerology sets in Step 0 may be configured using the logical channel configuration information in Step 1.

In the present invention, for example, the numerology set configuration information may include a minimum value of numerology/TTI duration(s) for a UE or logical channel(s) of the UE, and a maximum value of the numerology/TTI duration(s). The network may configure one or more numerology set(s) using numerology set configuration or logical set configuration information which includes maximum and minimum value(s) of numerology/TTI duration(s). For another example, the network may configure a UE with a logical channel using logical channel configuration information for the logical channel, and the UE receives the logical channel configuration information for the logical channel. The logical channel configuration information may include numerology set configuration information for the logical channel. The numerology set information for the logical channel may include a minimum value of numerology/TTI duration(s) for the logical channel in addition to a maximum value of numerology/TTI duration(s) for the logical channel.

A network sends a configuration information of a logical channel or a radio bearer to a UE. The configuration information may includes a logical channel identifier, i.e., LCID; or a radio bearer identifier, i.e., RBID; a minimum value of numerology/TTI duration(s) associated with the logical channel identified by the LCID, i.e., MIN_TTI; or a maximum value of numerology/TTI duration(s) associated with the logical channel identified by the LCID, i.e., MAX_TTI.

The network can send multiple configuration information for multiple logical channels or multiple radio bearers. For each logical channel or radio bearer, the minimum and/or the maximum value of numerology/TTI duration(s) may be different. The network provides an uplink grant with an indication indicating a numerology/TTI duration associated with the uplink grant.

If the UE receives the configuration information of the logical channel, the UE follows the following rule when performing a LCP procedure in order to generate a MAC PDU. An uplink resource with a numerology/TTI duration within the range from the minimum value of numerology/TTI duration(s) up to the maximum value of the numerology/TTI duration(s) can be used for transmitting data from the logical channel or the radio bearer. An uplink resource with a numerology/TTI duration which is smaller than the minimum value of the numerology/TTI duration(s) cannot be used for transmitting data from the logical channel or the radio bearer. An uplink resource with a numerology/TTI duration which is larger than the maximum value of the numerology/TTI duration(s) cannot be used for transmitting data from the logical channel or the radio bearer.

When the UE receives the uplink grant and the UE generates a MAC PDU to be transmitted via the uplink grant, the UE includes data from the logical channel if the numerology/TTI duration associated with the uplink grant is within the range of [MIN_TTI, MAX_TTI] for the logical channel. In other words, when the UE receives the uplink grant and the UE generates a MAC PDU to be transmitted via the uplink grant, the UE includes data from the logical channel if MIN_TTI≤a numerology/TTI duration associated with the uplink grant≤MAX_TTI; or if MIN_TTI<a numerology/TTI duration associated with the uplink grant≤MAX_TTI; or if MIN_TTI≤a numerology/TTI duration associated with the uplink grant<MAX_TTI; or if MIN_TTI<a numerology/TTI duration associated with the uplink grant<MAX_TTI.

When the UE receives the uplink grant and the UE generates a MAC PDU to be transmitted via the uplink grant, the UE doesn't include data from the logical channel if the numerology/TTI duration associated with the uplink grant is outside of the range of [MIN_TTI, MAX_TTI]. In other words, when the UE receives the uplink grant and the UE generates a MAC PDU to be transmitted via the uplink grant, the UE doesn't include data from the logical channel if a numerology/TTI duration associated with the uplink grant≤MIN_TTI; or if a numerology/TTI duration associated with the uplink grant<MIN_TTI; or if MAX_TTI≤a numerology/TTI duration associated with the uplink grant; or if MAX_TTI<a numerology/TTI duration associated with the uplink grant.

Alternatively, there can be a numerology set (e.g. TTI Set) including two values, i.e., one is for a minimum value and the other one is maximum value of numerology/TTI duration range. For example, TTI Set 1=[MIN_TTI 1, MAX_TTI 1], TTI Set 2=[MIN_TTI 2, MAX_TTI 2], TTI Set 3=[MIN_TTI 3, MAX_TTI 3], and so on. Range of each set may not be exclusive, i.e., range of each set may overlapped. Each set can be identified by a numerology set identifier (i.e., NumSetID) or TTI Set Identifier (i.e., TSID). Those sets can be configured to a UE by network via layer 2/3 signaling, or pre-defined in the specification documents. When the network configures a logical channel, the network can send the configuration information including LCID and TSID, where TTI Set identified by TSID is associated with the logical channel identified by LCID.

An example using numerology set (configuration) information according to the present invention is explained below.

Step 1. A network configures UE with two logical channels (LC1 and LC2) by sending configuration information. The configuration information includes information indicating Logical Channel=LCID1, MIN_TTI=X1, MAX_TTI=Y1; and information indicating Logical Channel=LCID2, MIN_TTI=X2, MAX_TTI=Y2, where X1<X2<Y1<Y2.

Step 2. The UE configures two logical channels (LC1 and LC2) as indicated by the configuration information.

Step 3. The network sends an uplink grant to the UE which is associated with TTI K.

Step 4. If the UE receives the uplink grant sent by the network in Step 3, the UE generates a MAC PDU to be transmitted using the uplink grant. When the UE generates the MAC PDU to be transmitted via the uplink grant, the UE includes data from LC1 and/or LC2 as follows. If K<X1, the UE doesn't include any data from LC1 and LC2 into the MAC PDU. If X1≤K<X2, the UE includes data from LC1 but doesn't include data from LC2 into the MAC PDU. If X2≤K≤Y1, the UE includes data from LC1 and LC2 into the MAC PDU. If Y1≤K≤Y2, the UE includes data from LC2 but doesn't include data from LC1 into the MAC. If Y2<K, the UE doesn't include any data from LC1 and LC2 into the MAC PDU.

Another example using numerology set (configuration) information according to the present invention is explained below.

Step 1. A network configures a UE with TTI Set(s) as follows: TTI Set1=[MIN_TTI=X1, MAX_TTI=Y1], TTI Sett Identifier is TSID1; and TTI Set2=[MIN_TTI=X2, MAX_TTI=Y2] TTI Set2 Identifier is TSID2, where X1<X2<Y1<Y2.

Step 2. The network configures the UE with two logical channels (LC1 and LC2) by sending configuration information. The configuration information includes information indicating Logical Channel=LCID1, TSID1; and Logical Channel=LCID2, TSID2.

Step 2. The UE configures two logical channels (LC1 and LC2) as indicated by the configuration information.

Step 3. The network sends an uplink grant to the UE which is associated with TTI K.

Step 4. If the UE receives the uplink grant sent by the network in Step 3, the UE generates a MAC PDU to be transmitted using the uplink grant. When the UE generates the MAC PDU to be transmitted via the uplink grant, the UE includes data from LC1 and/or LC2 as follows. If K<X1, the UE doesn't include any data from LC1 and LC2 into the MAC PDU. If X1≤K<X2, the UE includes data from LC1 but doesn't include data from LC2 into the MAC PDU. If X2≤K≤Y1, the UE includes data from LC1 and LC2 into the MAC PDU. If Y1≤K≤Y2, the UE includes data from LC2 but doesn't include data from LC1 into the MAC PDU. If Y2<K, the UE doesn't include any data from LC1 and LC2 into the MAC PDU.

Figure 10:
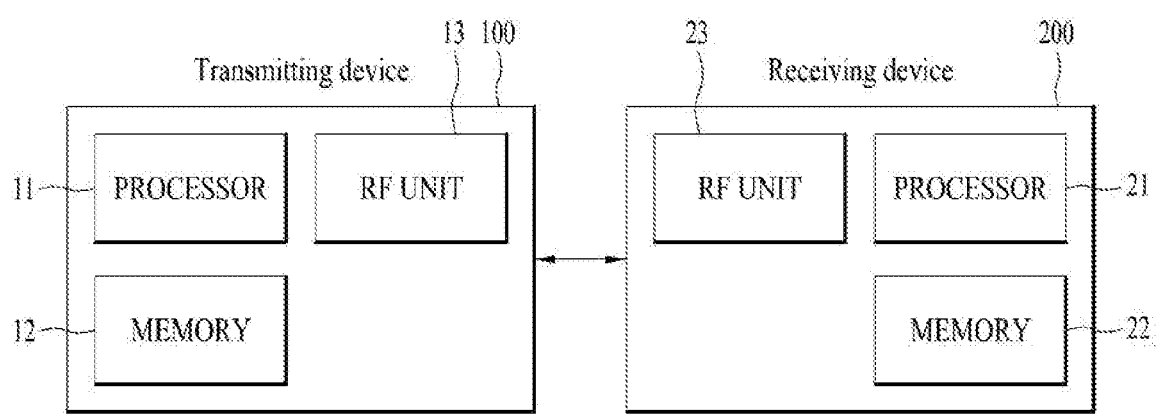
FIG. 10 is a block diagram illustrating elements of a transmitting device 100 and a receiving device 200 for implementing the present invention.

FIG. 10. is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor can be configured to operate according to the present invention, or control the UE RF unit to receive or transmit signals according to the present invention. The eNB processor can be configured to operate according to the present invention, or control the eNB RF unit to receive or transmit signals according to the present invention.

The eNB processor may control the eNB RF unit to transmit first configuration information for one or more numerology sets, where each numerology set includes one or more numerologies. Each numerology indicates at least a subcarrier spacing or transmission timer interval duration. The eNB RF unit may control the eNB RF unit to transmit second configuration information for one or more logical channels, where each logical channel is mapped to one or more numerologies. The UE processor may control the UE RF unit to receive the first configuration information for the one or more numerology sets. The UE processor may control the UE RF unit to receive the second configuration information for the one or more logical channels. The first configuration information may indicate each numerology set by indicating the minimum and/or maximum value(s) of numerologies belonging to a corresponding numerology set. The one or more numerology sets configured using the first control information may be configured using the second configuration information instead of the first configuration information. The firs control information may be part of the second configuration information.

The eNB processor may control the eNB RF unit to transmit a first UL grant for a new transmission. The UE processor may control the UE RF unit to receive the first UL grant. The first UL grant may include information indicating a numerology set (first numerology set) associated with the first UL grant. The UE processor may generate a medium access control (MAC) protocol data unit (PDU) based on the UL grant and the information indicating the numerology set associated with the first UL grant. The UE processor may generate the MAC PDU such that the MAC PDU contains data from a logical channel of which every numerology belongs to the first numerology set. The UE processor may generate the MAC PDU to contain no data from a logical channel mapped to any numerology not belonging to the first numerology set. The UE processor may control the UE RF unit to perform a new transmission of the MAC PDU by using the first UL grant. The first UL grant may include information indicating a numerology (first numerology) associated with the first UL grant, and the UE processor may control the UE RF unit to perform the new transmission of the MAC PDU using the first UL grant according to the first numerology. The first numerology is numerology belonging to the first numerology set. The eNB processor may control the eNB RF unit to receive the MAC PDU using the first UL grant (based on the first numerology). If the eNB RF unit fails to receive the MAC PDU or if the eNB processor fails decoding the MAC PDU successfully, the eNB processor may control the eNB RF unit to transmit a second UL grant for retransmission. The second UL grant includes information indicating a numerology for the retransmission. The UE processor may monitor PDCCH. If the UE processor detects a PDCCH and the PDCCH includes the second UL grant for retransmission, the UE processor may control the UE RF unit to perform a retransmission of the MAC PDU using the second UL grant if the numerology for the retransmission belongs to the numerology set indicated by the first UL grant. In other words, the UE processor may control the UE RF unit to receive a DL or UL grant. If the UE RF unit receive a grant and if the received grant is the second UL grant, the UE processor performs a retransmission of the MAC PDU by using the second UL grant if the numerology for the retransmission belongs to the numerology set indicated by the first UL grant. The UE processor does not control the RF unit to perform the retransmission of the MAC PDU if the numerology for the retransmission does not belong to the numerology set indicated by the first UL grant.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for transmitting, by a user equipment (UE), a data unit in a wireless communication system, the method comprising:
   receiving, by the UE, first configuration information for one or more numerology sets, each numerology set including one or more numerologies;
   receiving, by the UE, second configuration information for one or more logical channels, each logical channel mapped to one or more numerologies;
   receiving, by the UE, a first uplink (UL) grant for new transmission, the first UL grant including information indicating a numerology set associated with the first UL grant;
   generating, by the UE, a medium access control (MAC) protocol data unit (PDU); and
   performing, by the UE, a new transmission of the MAC PDU using the first UL grant,
   wherein the MAC PDU contains data from a logical channel of which every numerology belongs to the numerology set.

2. The method according to claim 1,
   wherein the MAC PDU contains no data from a logical channel mapped to a numerology not belonging to the numerology set.

3. The method according to claim 1, further comprising:
   receiving, by the UE, a second UL grant for retransmission, the second UL grant including information indicating a numerology for the retransmission; and
   performing, by the UE, a retransmission of the MAC PDU by using the second UL grant if the numerology for the retransmission belongs to the numerology set indicated by the first UL grant.

4. The method according to claim 1,
   wherein the UE does not perform the retransmission of the MAC PDU if the numerology for the retransmission does not belong to the numerology set indicated by the first UL grant.

5. The method according to claim 1,
   wherein each numerology indicates at least a subcarrier spacing or transmission timer interval duration.

6. The method according to claim 1,
   wherein the first configuration information indicates each numerology set by indicating the minimum and/or maximum value(s) of numerologies belonging to a corresponding numerology set.

7. The method according to claim 1,
   wherein the UE is an autonomous vehicle that communicates with at least a mobile terminal, a network, and another autonomous vehicle other than the UE.

8. A user equipment (UE) for transmitting a data unit in a wireless communication system, the UE comprising:
   a radio frequency (RF) unit, and
   a processor configured to control the RF unit, the processor configured to:
   control the RF unit to receive first configuration information for one or more numerology sets, each numerology set including one or more numerologies;
   control the RF unit to receive second configuration information for one or more logical channels, each logical channel mapped to one or more numerologies;
   control the RF unit to receive a first uplink (UL) grant for new transmission, the first UL grant including information indicating a numerology set associated with the first UL grant;
   generate a medium access control (MAC) protocol data unit (PDU); and
   control the RF unit to perform a new transmission of the MAC PDU using the first UL grant,
   wherein the MAC PDU contains data from a logical channel of which every numerology belongs to the numerology set.

9. The UE according to claim 8,
wherein the MAC PDU contains no data from a logical channel mapped to a numerology not belonging to the numerology set.

10. The UE according to claim 8,
wherein the processor is further configured to:
control the RF unit to receive a second UL grant for retransmission, the second UL grant including information indicating a numerology for the retransmission; and
perform a retransmission of the MAC PDU by using the second UL grant if the numerology for the retransmission belongs to the numerology set indicated by the first UL grant.

11. The UE according to claim 8,
wherein the processor does not control the RF unit to perform the retransmission of the MAC PDU if the numerology for the retransmission does not belong to the numerology set indicated by the first UL grant.

12. The UE according to claim 8,
wherein each numerology indicates at least a subcarrier spacing or transmission timer interval duration.

13. The UE according to claim 8,
wherein the first configuration information indicates each numerology set by indicating the minimum and/or maximum value(s) of numerologies belonging to a corresponding numerology set.

\* \* \* \* \*